(12) United States Patent
D'Amora

(10) Patent No.: US 6,184,889 B1
(45) Date of Patent: Feb. 6, 2001

(54) METHOD AND APPARATUS FOR SUPPORTING NON-POWER-TWO TEXTURE SIZES FOR VOLUME RENDERING

(75) Inventor: Bruce David D'Amora, Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/170,258

(22) Filed: Oct. 13, 1998

(51) Int. Cl.$^7$ ................................................. G06F 15/00
(52) U.S. Cl. ................................................................ 345/419
(58) Field of Search ................................... 345/419, 428, 345/433, 117, 121, 132, 516, 517

(56) References Cited

U.S. PATENT DOCUMENTS

| 5,719,598 | * | 2/1998 | Latham | 345/419 |
| 5,917,494 | * | 6/1999 | Arai et al. | 345/419 |
| 6,049,625 | * | 4/2000 | Sakamoto | 345/419 |

* cited by examiner

*Primary Examiner*—Phu K. Nguyen
(74) *Attorney, Agent, or Firm*—Volel Emile; Felsman, Bradley, Vaden, Gunter & Dillon, LLP

(57) ABSTRACT

A volume of data, acquired from devices that output three dimensional data, is parsed into smaller subvolumes, or digital data segments, and each digital data segment is rendered allowing application of the original data without modifying or scaling the three dimensional volume of raw data. If measurements of the whole volume of data received by texture mapping hardware is not completely parsable into pre-defined digital data segments, dimensions of any irregular digital data segment are adjusted to overlap an adjoining segment to allow rendering of adjusted, irregular digital data segments as if they were pre-defined digital data segments. The adjusted texture coordinates are utilized to determine the point where the texture mapping engine begins texturing and to determine the percentage of overlap of the adjusted irregular digital data segment with the adjoining pre-defined digital data segment. This calculation accounts for overlap and allows application of digital data segments whose dimensions are not parsable into pre-defined digital data segments, or subvolumes.

10 Claims, 3 Drawing Sheets

Perspective
300

Raw Data

Processed Data

METHOD AND APPARATUS FOR SUPPORTING NON-POWER-TWO TEXTURE SIZES FOR VOLUME RENDERING

BACKGROUND OF THE INVENTION

1. Technical Field

The present invention relates in general to data processing systems and in particular to data processing systems with graphics displays. Still more particularly, the present invention relates to accurate rendering and display of three dimensional volumes utilizing a data processing system having a three dimensional graphics adapter and a high resolution display.

2. Description of the Related Art

Graphics image displays have progressed from depicting a flat, two dimension ("2D") representation of an object to depicting a 2D simulation of a three dimension ("3D") solid. Construction of 3D objects may be done through the utilization of so-called "wireframe modeling," where a wireframe model is a construct of the object utilizing lines to render the edges of an object. A surface can be constructed by shading or filling in the wireframe representation to give the appearance of a solid, three dimensional object.

Surface detail is improved by utilizing a technique called texture mapping. Texture mapping is the process of adding patterns and photo-realistic images to displayed objects. Typically, applications store descriptions of primitives (points, lines, polygons, etc.) in memory that define components of an object. When a primitive is rasterized (converted from a mathematical element to equivalent images composed of pixels on a display screen), a texture coordinate is computed for each "pixel" (short for picture element). Texture coordinates assigned to the vertices of the primitives are interpolated to calculate additional coordinates of each pixel utilized to fill the polygon. A texture coordinate is utilized by the texture mapping engine to look up "texel" (short for texture element and represents stored texture values) values from an enabled texture map. At each rendered pixel, several texels may be utilized to define one or more surface properties, such as shading or color, at that pixel.

Texture mapping hardware typically supports width, height and depth sizes that are power-of-two (a term describing data measured in units of $2^n$, where n is an integer in a range from zero to infinity). A texture map is basically a one, two or three dimensional image composed of elements (texels) that can have one, two, three or four components—R, G, B and A. Texture coordinates are floating point numbers between 0 and 1 and are utilized to determine the proper coordinates to begin adding texture to an object. Also, texture coordinates determine how much texture to add when moving pieces of the texture from texture memory to the computer display.

A texture mapping engine utilizes special, high speed dedicated memory and maps data contained in the dedicated memory to the graphics frame buffer. Texture memory is usually contained on a removable graphics card in the data processing system. The graphics card is limited in size since it has to fit within the data processing system housing. This limits the amount of texture memory available on the adapter due to space and cost limitations. A typical medical imaging system such as a Computed Tomography ("CT") scanner, which generates high definition three dimensional data of hard tissue in patients using multiple X-ray exposures, usually generates 32 megabytes and more of data. Magnetic Resonance Imaging ("MRI") devices, which does best in soft tissue scans, may generate the same amount of data and more per MRI scan. Because of limited fast memory, an application may break the data into eight portions of four megabytes each and load each portion, one at a time, into texture memory to process the data. Processed data is then sent to a frame buffer where the data is assembled and finally scanned by a digital-to-analog converter and sent to a high-resolution (1280×1024 or more) computer display.

There are drawbacks to traditional rendering, where only the surface of an object can be displayed. The interior of the rendered object, if displayed in a sectional view, is homogeneous interior details are not shown. Volume rendering (capable of displaying all contents of a displayed volume) and a 3D texture map is utilized to display information derived from the interior of the object.

Volume rendering, utilizing the proper algorithms, may be utilized to reveal interior details of a 3D image. For example, a human head may be displayed on a computer screen as a two dimensional photograph. The head may also be reproduced utilizing a wireframe representation and texture mapping to produce a simulated three dimensional surface. The photograph, as well as the simulated three dimensional solid, would reveal surface features of the head, such as hair, nose, ears, eyes, etc. However, a volume rendering of the head may be manipulated to display surface features as translucent, then reveal bone, brain, blood vessels, etc., as solid and simulated in three dimension. The resulting image has the quality of a volume composed of a mixture of materials with varying translucence and opacity.

In order to implement manipulation of a rendered simulated 3D image, each volume element ("voxel," which is similar to a pixel, with a third, depth, dimension displayed) in the volume rendering display is assigned a numerical value based on its location within the volume. A numerical value may be associated with a color and an opacity at that particular point. The numerical value may be assigned an arbitrary value between zero and one, e.g., 0.1. In the case of opacity, if the opacity scale ranked 1 as totally opaque and 0 as transparent, that particular point, 0.1, would return a reading of cloudy or nearly transparent. The set of points with equal numerical values on the volume is termed an iso surface. The iso surface value may define a specific structure in the volume, such as the cornea of the eye or a bone. Additionally, an opacity level may be arbitrarily attached to all scalar fields. If opacity for the skull was set to a low value, it would appear translucent and objects within the skull having higher opacities would be more visible. Volume rendering of the head, with operator determined opacity values, depicts boundaries where differing opacities form level surfaces depicting various objects within the head.

Volume rendering is especially useful in CT, MRI (Magnetic Resonance Imaging) and seismic scanners. Rendering engines, for handling data received from these devices, require data with dimensions that are pre-defined and usually expressed as a power-of-two (see above). This is a problem because texture data derived from the aforementioned CTs, MRIs and seismic scanners is usually not power-of-two in one or more dimensions.

In most three dimensional rendering engines, the width, height and depth of the raw data are processed utilizing dimensions with powers-of-two limitations (historical, rather than hardware or software limitations). Generally, width and height coordinates of data are supplied with power-of-two dimensions, but the depth is seldom available in power-of-two dimensions. Data may be acquired from a scan and processed for utilization by a computer in either one large block of three dimensional data or multiple slices of two dimensional data (for our purposes, three dimensional data will be discussed here). For example, sensor data received by a rendering engine may be 128 by 128 by 57 units. Utilization of the sensor data will present a problem because of the non-power-of-two dimension of the depth. The usual method for rendering an image from data having non-power-of-two measurements is to re-sample the data so that it measures 128 by 128 by 32 or 64—a pre-processing step that forces data to fit limitations of the graphics rendering engine. However, forcing data to fit limits prescribed by the graphics engine, may cause faulty representation of the raw data and artifacts.

FIGS. 3A–3C depicts an existing method of rendering non-power-of-two segments. Perspective 300, in FIG. 3A, represents a volume of raw data to be rendered. A digital data segment, comprising five subvolume elements ("voxels"), and illustrated by digital data segment 301, is representative of data that would not be processed without returning an error indication. The five voxels cannot be loaded into texture memory since voxel 306, with a size of 0.5, is not power-of-two and would produce an error. As depicted in the side view of digital data segment 301, FIG. 3B, voxels 302 and 304 are 2.0, which is a power-of-two size ($2^1$) and voxel 306 is a non-power-of-two remainder data segment.

FIG. 3C illustrates digital data segment 301 after processing and prior to rendering. A standard method for rendering voxel 306, requires that remainder data, represented by data voxel 306, be pre-processed (or re-sampled), to fit power-of-two dimensions. As FIG. 3C illustrates, voxel 306 is pre-processed so that the volume now consists of two power-of-two voxels, 302 and 304. The pre-processed data now fits the requirement of a power-of-two dimension because the non-power-of-two voxel 306 has been reduced to nothing. Voxel 306 is essentially deleted and original raw data has been eliminated from the rendering because of the sampling (in this instance scaling) mechanism.

MRI and CT scans, as mentioned earlier, are excellent applications of three dimensional or volume rendering. CT and MRI's provide quality images of different structures. By merging the CT and MRI images, a picture of a part of the anatomy, say a person's brain, becomes more complete. A brain surgeon is able to properly plan an operation based on the merged images. However, if the data has been pre-processed to either stretch or shrink the data to fit power-of-two dimensions, critical data may be distorted or omitted. Addition, reduction and/or deletion of data, may cause major consequences. For example, breast cancer, if detected early, may be treatable. If a three dimensional image taken of a breast with a small spot of cancer is pre-processed, the spot may be removed from the volume rendering because that particular area of data is non-power-of-two. As is obvious, ramifications may be that breast cancer may not be detected and an incorrect diagnosis would be given.

It would be desirable, therefore, to provide a method of display that would accurately display three dimensional data without scaling or deleting the original raw data.

SUMMARY OF THE INVENTION

It is therefore one object of the present invention to provide a method of volume rendering that reduces or eliminates the need to scale raw data.

It is another object of the present invention to provide a method of volume rendering that retains data which may fall outside a pre-defined size restriction It is yet another object of the present invention to provide a method of volume rendering that accurately renders raw data without scaling or deleting data and requires no additional hardware or pre-processing of data.

It is a further object of the present invention to provide a method of volume rendering, which accurately renders raw data without pre-processing and utilizes commercially available 3D texture mapping hardware.

The foregoing objects are achieved as is now described. A volume of data, acquired from devices that output three dimensional data, is parsed into smaller subvolumes, or segments, and each segment is rendered allowing application of the original data without modifying or scaling the three dimensional data. If the measurements of the whole volume of data received by texture mapping hardware is not completely parsable into pre-defined segments, any irregular segment is adjusted to overlap an adjoining segment to allow rendering of adjusted, irregular segments as if they were pre-defined segments. The adjusted texture coordinates are utilized to determine the point where the texture mapping engine begins texturing and to determine the percentage of overlap of the adjusted irregular segment with the adjoining pre-defined segment. This calculation accounts for overlap and allows application of segments whose dimensions are not parsable into pre-defined segments, or subvolumes.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
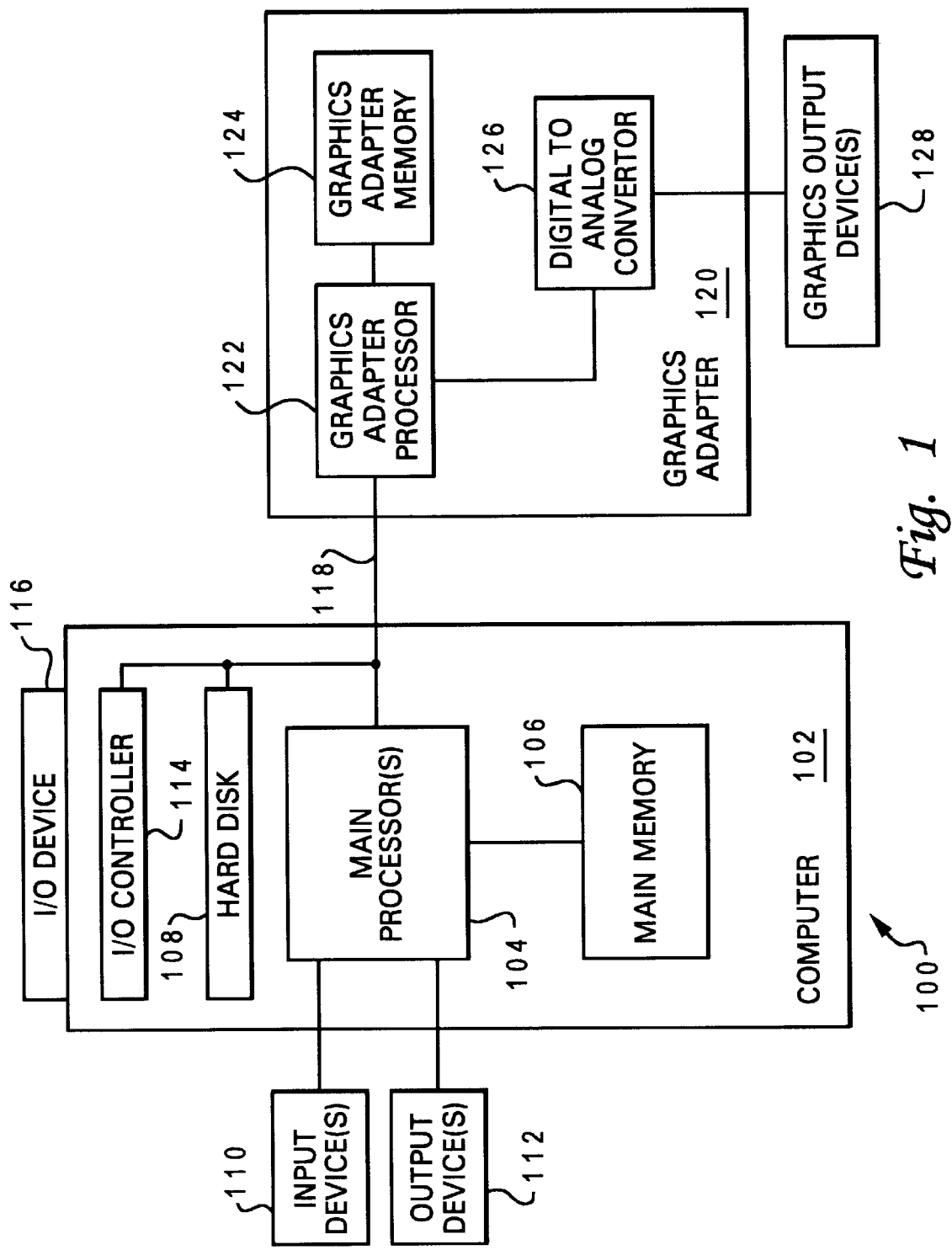
FIG. 1 depicts a high level block diagram of a typical data processing system capable of being utilized by a preferred embodiment of the present invention.

With reference now to the figures, and in particular with reference to FIG. 1, a high level block diagram of a typical data processing system capable of being utilized by a preferred embodiment of the present invention, is depicted. Data processing system 100 comprises computer 102 graphics adapter 120 and graphics output device(s) 128. Computer 102 includes main processor(s) 104 interconnected through bus 118 with main memory 106, disk storage 108, input device(s) 110, output device(s) 112, I/O controller 114 and I/O device(s) 116. Main processor(s) 104 may include a single processor or multiple processors. Output device(s) 112, may include a plotter, printer or other types of output devices. Input device(s) 110 may include a keyboard, a mouse or other types of input devices. I/O device(s) 116 may include removable storage media drive such as a floppy drive for reading magnetic diskettes, a CDROM (compact disk, read only memory) drive, a removable hard disk drive, or other types of removable storage media. I/O device(s) 116 is controlled by I/O controller 114.

Main processor 104 may also be interconnected to graphics adapter 120 through bus 118. Graphics adapter 120, usually a removable card, receives instructions regarding graphics from main processor(s) 104 on bus 118. Graphics adapter 120 executes instructions received from main processor(s) 104 utilizing graphics processor(s) 122. Graphics adapter 120 may include specialized hardware and software for rendering three dimensional data. Graphics memory 124, usually high speed and expensive, is utilized by graphics processor(s) 122 to store three dimensional data being processed, such as seismic, CT or MRI data and is usually limited in amount by the physical size of graphics adapter 120. The main processor may be coupled, through graphics adapter 120, to graphics output device(s) 128 such as a graphics display terminal. Graphics processor(s) 122 processes three dimensional data received from computer 102, utilizing graphics memory 124. Graphics adapter 120 then converts the digitally stored data into RGB signals, utilizing digital to analog converter 126, and transmits the converted signals to the graphics output device(s) 128, thereby rendering a desired three dimensional output.

Figure 2:
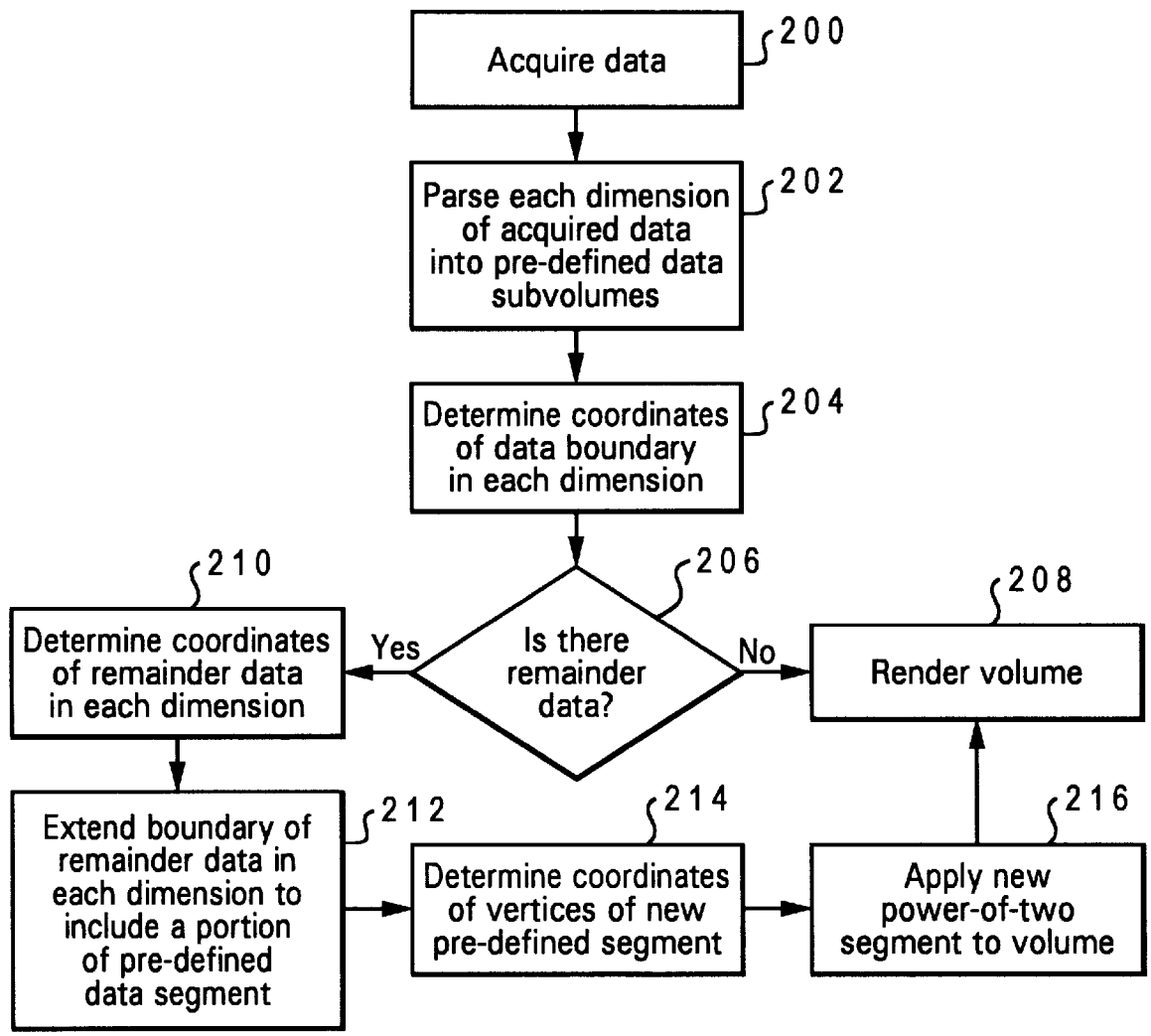
FIG. 2 is a high level logic flow chart of the process for modifying remainder data in accordance with a preferred embodiment of the present invention.
Figure 3A:
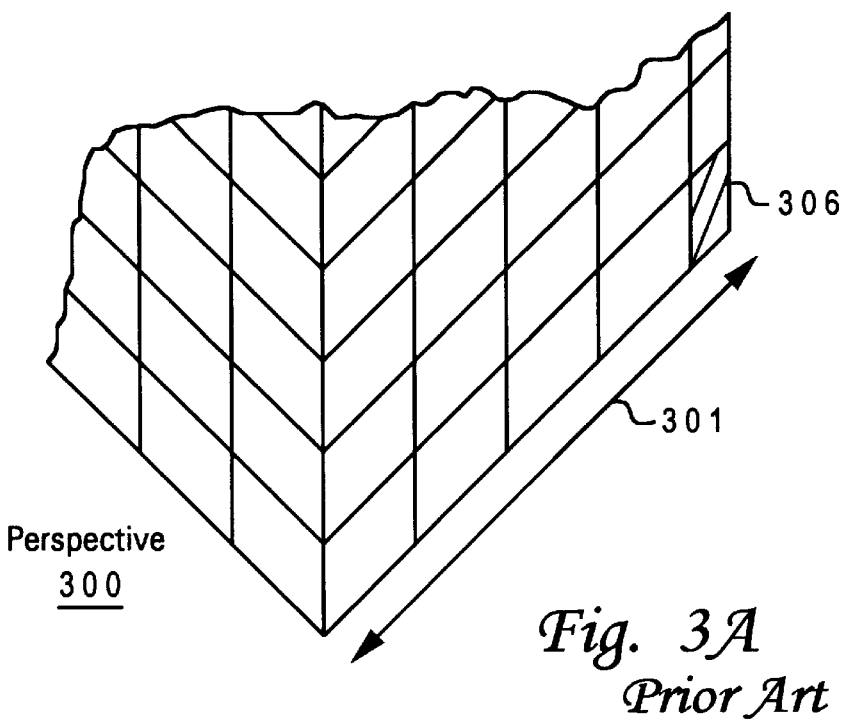
FIGS. 3A–3C depicts a known method for rendering non-power-of-two volumes.
Figure 3B:
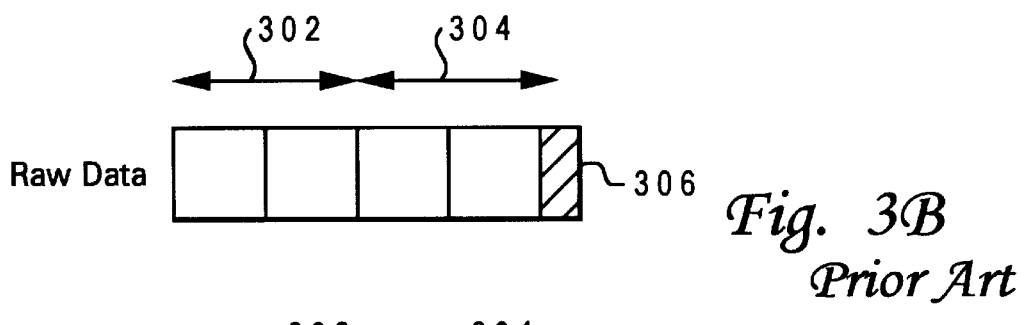
Figure 3C:
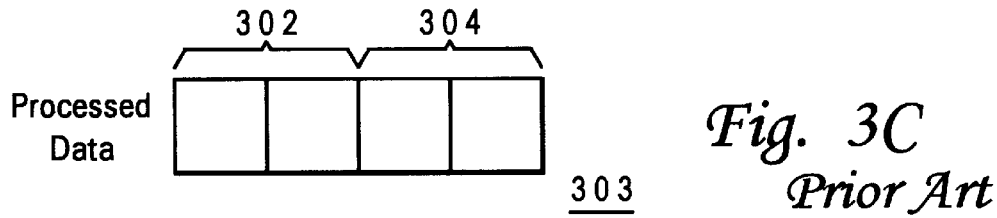

Referring now to FIG. 2, a high level logic flow chart of the process of modifying remainder data (data with undefined dimensions or in this example, non-power-of-two dimensions) in accordance with a preferred embodiment of the present invention, is illustrated. The process begins with step 200, which depicts the receipt of a volume of three dimensional, raw texture data being received by a texture mapping engine (a combination of specialized hardware and software, usually on board the graphics adapter card). The process then proceeds to step 202, which illustrates parsing the data into subvolumes of pre-defined digital data segments, whereas in this example, the pre-defined digital data segments are utilizing parsed power-of-two dimensions. The process next passes to step 204, which depicts determination of the coordinates of the volume data received by the texture mapping engine.

The process continues to step 206, which illustrates a determination of whether any of the data received, utilizing coordinates determined in step 204, is a remainder data (data with non-power-of-two dimensions). If the received raw data has no remainder data, the process then proceeds to step 208, which depicts the data received by the texture engine, and thereafter rendered into a resultant three dimensional volume. However, if there is remainder data, the process proceeds instead from step 206 to step 210, which illustrates a determination of the coordinates of the adjoining pre-defined subvolume segments in each of the three dimensions. Extending the boundary enables determination of coordinates that will be used to apply appropriate texture values to the region of the adjoining pre-defined segment that is included in the new pre-defined segment.

The process then passes to step 212, which depicts extension of a boundary of the remainder subvolume (segment) to coordinates within an adjoining pre-defined segment. The coordinates define a sufficient volume of the adjoining segment to increase the size of the remainder segment to a new pre-defined segment size for rendering purposes. Next, the process passes to step 214, which illustrates a determination of the coordinates of the new pre-defined segment produced by the addition of the remainder segment and a portion of the adjoining pre-defined segment. Coordinates for texture values of the modified segment are then adjusted by a value determined by calculating the difference between the adjoining pre-defined segment and the actual remainder segment and dividing that value by the size of the adjoining pre-defined segment. Thereafter, the resulting polygon is scaled to the appropriate size. The process then passes to step 216, which depicts application of the new segment to the original volume, forming a new volume and application of texture to the new volume. The process then proceeds to step 208, which illustrates the texture engine rendering the data received into a resultant three dimensional volume for display.

Figure 4:
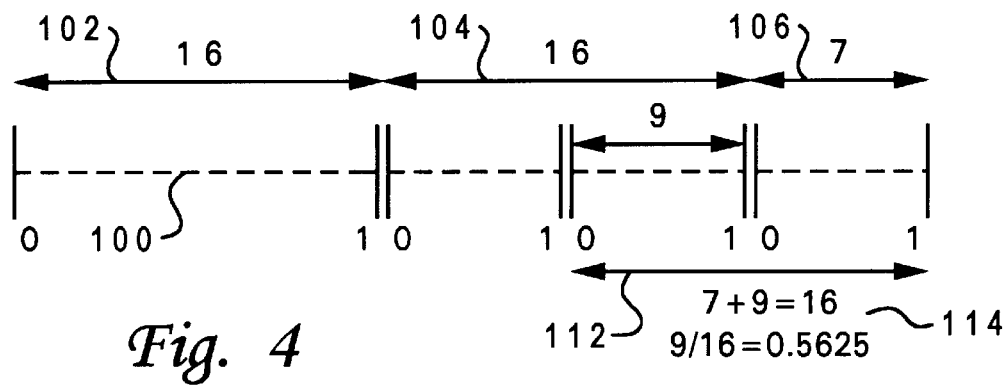
FIG. 4 illustrates a one dimensional texture having a remainder segment and calculations for modification of the remainder segment, in accordance with a preferred embodiment of the present invention.

Referring to FIG. 4, a one dimensional digital data segment, having remainder data, in which a preferred embodiment of the present invention may be implemented, is depicted. Line 400, represents a portion of one dimension (width, for example) of data contained in a three dimensional volume (the method of the present invention would be applied to each dimension in the three dimensional volume). Line 400 is measured in texels (sub-textures) and is 39 texels in width. Segment 402 and segment 404, each measure a pre-defined width of 16 texels where the number 0 and the number 1 represent the beginning and end, respectively, of a segment. Either or both segments 402 and 404, if loaded into a texture memory, are acceptable to currently available texture mapping software/hardware because of the pre-defined size of each segment of 16 ($2^n$, where n=4) texels. However, if all the data represented by line 400 is loaded into texture memory, an error will be recorded by the software/hardware because of the non-power-of-two size, 39 texels, of the data. Segment 406, represents 7 texel sub-textures and is considered remainder data—a remaining voxel after parsing the original data into pre-defined segments.

In order to modify line 400 so that it will be accepted for processing by texture memory, a portion of segment 404 is combined with segment 406 to form a new segment 412. The portion of segment 404 to be combined with segment 406 is determined by an amount that will allow a modified segment 406 (segment 412) to be parsed so that texture coordinates of segment 406 to make it a pre-defined power-of-two length.

Texture coordinates of segment 406 are calculated by dividing the difference between an adjoining pre-defined segment (segment 404) and a remainder segment (segment 406), by the size of the pre-defined segment (segment 404). This calculation accounts for overlap in the two segments and provides the texture mapping engine with information about where to begin texturing. Segment adjustment 414 illustrates calculation of the texture coordinates of new segment 412 (modified segment 406). Following the rendering of segment 404, segment 412 is rendered utilizing the calculated texture coordinates.

The foregoing description enables data acquired from three dimensional data sources to be processed accurately without scaling or cancelling data that is not within pre-defined dimensions. As has been discussed, by scaling or distorting raw data to fit known texture mapping engines, a rendered display of the received data is usually inaccurate. Important information may be discarded or scaled out of the display and can cause both invalid and inaccurate conclusions which can lead to critical errors.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of rendering three dimensional data for presentation on a data processing system display, comprising the steps of:
   parsing said three dimensional data into one or more digital data segments, each having a length equal to a power-of-two and a remainder digital data segment having a length which is not equal to said power-of-two;
   forming a new digital data segment comprising said remainder digital data segment and a selected portion of a preceding digital data segment such that said new digital data segment has a length equal to said power-of-two; and
   rendering said three dimensional data.

2. The method of claim 1, further comprises the step of overlapping said texture coordinates of said new digital data segment and said preceding digital data segment.

3. The method of claim 1, wherein parsing said three dimensional data into one or more digital data segments, each having a length equal to a power-of-two and a remainder digital data segment having a length which is not equal to a power-of-two, further comprises the step of determining coordinates for vertices of all primitives within said three dimensional data.

4. The method of claim 1, wherein forming a new three dimensional digital data segment comprising said remainder three dimensional digital data segment and a selected portion of a preceding digital data segment such that said new digital data segment has a length equal to a power-of-two, further comprises the steps of:
   determining coordinates of vertices of all primitives of said remainder digital data segments;
   extending coordinates of a boundary of said remainder digital data segment, utilizing said vertices, so that an adjoining boundary of said preceding digital data segment is indicated within selected coordinates of said boundary of said remainder digital data segment; and
   determining coordinates for said extended boundary of said remainder digital data segment to include said selected portion of a preceding digital data segment, wherein said selected portion of a preceding digital data segment combined with said remainder digital data segment forms said new digital data segment.

5. The method in claim 4, further comprising the steps of:
   determining end coordinates of said preceding digital data segment;
   combining a portion of said preceding digital data segment with said remainder digital data segment to form a new digital data segment having the same dimensions as one of said one or more digital data segments; and
   calculating said texture coordinates for said new digital data segment.

6. An apparatus for rendering three dimensional data for presentation on a data processing system display, having a processor, a memory storage device, a display device and a bus connecting said processor, said memory storage device and said display device, comprising:
   a texture mapping engine having a dedicated memory;
   conversion means for processing three dimensional data;
   division means for parsing said three dimensional data into one or more digital data segments, each having a length equal to a power-of-two and a remainder digital data segment having a length which is not equal to a power-of-two;
   formation means for forming a new digital data segment comprising said remainder digital data segment and a portion of said preceding digital data segment such that said new digital data segment has a length equal to a power-of-two; and
   rendering means for rendering said three dimensional data.

7. The apparatus of claim 6, further comprises
   means for overlapping said texture coordinates of said new digital data segment and said preceding digital data segment.

8. The apparatus of claim 6, wherein division means for parsing said three dimensional data into one or more digital data segments each having a length equal to a power-of-two and a remainder digital data segment having a length which is not equal to a power-of-two, further comprises calculation means for determining coordinates for vertices of all primitives within said three dimensional data.

9. The apparatus of claim 6, wherein formation means for forming a new digital data segment comprising said remainder digital data segment and a portion of said preceding digital data segment such that said new digital data segment has a length equal to a power-of-two, further comprises:
   calculation means for determining coordinates of vertices of said remainder digital data segment;
   boundary extension means for extending a boundary of said remainder digital data segments so that a selected portion of a preceding digital data segment is located within said coordinates of said remainder digital data segment; and
   calculation means for determining coordinates for said extended boundary of said remainder digital data segment to include said selected portion of a preceding digital data segment, wherein said portion of a preceding digital data segment, combined with said remainder digital data segment, forms said new digital data segment.

10. The apparatus in claim 9, further comprising:
    calculation means for determining end coordinates of said preceding digital data segment;
    connection means for combining a portion of said preceding digital data segment with said remainder digital data segment to form a new digital data segment having the same dimensions as one of said one or more digital data segments; and
    calculation means for adjusting said texture coordinates for said new digital data segment.

* * * * *

UNITED STATES PATENT AND TRADEMARK OFFICE
CERTIFICATE OF CORRECTION

PATENT NO. : 6,184,889 B1  
DATED : February 6, 2001  
INVENTOR(S) : D'Amora

Page 1 of 1

It is certified that error appears in the above-identified patent and that said Letters Patent is hereby corrected as shown below:

Title page,  
Item [54], please delete the title: METHOD AND APPARATUS FOR SUPPORTING NON-POWER-TWO TEXTURE SIZES FOR VOLUME RENDERING  
and insert instead: METHOD AND APPARATUS FOR SUPPORTING NON-POWER-OF-TWO TEXTURE SIZES FOR VOLUME RENDERING.

Column 1,  
Please delete the title: METHOD AND APPARATUS FOR SUPPORTING NON-POWER-TWO TEXTURE SIZES FOR VOLUME RENDERING  
and insert instead: METHOD AND APPARATUS FOR SUPPORTING NON-POWER-OF-TWO TEXTURE SIZES FOR VOLUME RENDERING.

Signed and Sealed this

Thirtieth Day of October, 2001

*Attest:*

NICHOLAS P. GODICI  
*Attesting Officer*   *Acting Director of the United States Patent and Trademark Office*